United States Patent
Zimmermann et al.

(10) Patent No.: US 8,000,907 B2
(45) Date of Patent: *Aug. 16, 2011

(54) FLUID FLOW RATE SENSOR AND METHOD OF OPERATION

(75) Inventors: Bernd D. Zimmermann, Ashland, OH (US); Tung-Sheng Yang, Mansfield, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/956,769

(22) Filed: Dec. 14, 2007

(65) Prior Publication Data

US 2008/0148840 A1    Jun. 26, 2008

Related U.S. Application Data

(63) Continuation of application No. 10/963,750, filed on Oct. 13, 2004, now Pat. No. 7,333,899.

(51) Int. Cl.
*G01F 1/00* (2006.01)
(52) U.S. Cl. ........................................... 702/45
(58) Field of Classification Search .................. 702/183, 702/185, 45, 46, 47, 49, 100
See application file for complete search history.

(56) References Cited

U.S. PATENT DOCUMENTS

| | | | |
|---|---|---|---|
| 3,335,606 A * | 8/1967 | Scarpa | 73/204.14 |
| 3,757,808 A * | 9/1973 | Peterson et al. | 137/2 |
| 4,471,661 A | 9/1984 | Edwards, Jr. | |
| 4,480,467 A | 11/1984 | Harter et al. | |
| 4,501,145 A | 2/1985 | Boegli et al. | |
| 4,785,665 A | 11/1988 | McCulloch | |
| 5,090,241 A * | 2/1992 | Kobayashi | 73/204.26 |
| 5,186,051 A | 2/1993 | Stecher et al. | |
| 5,831,159 A | 11/1998 | Renger | |
| 6,085,588 A | 7/2000 | Khadkikar et al. | |
| 6,134,952 A | 10/2000 | Garver et al. | |
| 6,588,268 B1 * | 7/2003 | Yamagishi et al. | 73/204.26 |
| 6,595,049 B1 | 7/2003 | Maginnis, Jr. et al. | |
| 6,912,870 B2 | 7/2005 | Gnadinger | |
| 2002/0032532 A1 | 3/2002 | Babel et al. | |
| 2002/0073772 A1 | 6/2002 | Bonne et al. | |
| 2003/0117623 A1 | 6/2003 | Tokhtuev et al. | |
| 2004/0261434 A1 | 12/2004 | Zentner et al. | |
| 2005/0268624 A1 | 12/2005 | Voglewede et al. | |
| 2005/0268639 A1 | 12/2005 | Hortin et al. | |

FOREIGN PATENT DOCUMENTS

JP    2000100606    * 4/2000

* cited by examiner

*Primary Examiner* — Drew A Dunn
*Assistant Examiner* — Stephen J Cherry
(74) *Attorney, Agent, or Firm* — Harness, Dickey & Pierce, P.L.C.

(57) ABSTRACT

A probe for a thermo-anemometer-type fluid flow rate sensor is disclosed. The probe comprises a tubular body member having a thermally conductive housing disposed within a fluid passageway and a detection module in the housing. The detection module includes a detection circuit and a heating circuit and is adapted to provide an output that varies in response to a change in temperature. The detection module is made from a ceramic substrate upon which the detection circuit and the heating circuit are deposited.

14 Claims, 8 Drawing Sheets

FLUID FLOW RATE SENSOR AND METHOD OF OPERATION

CROSS-REFERENCE TO RELATED APPLICATIONS

This application is a continuation of U.S. patent application Ser. No. 10/963,750 filed on Oct. 13, 2004, now U.S. Pat. No. 7,333,899. The disclosure of the above application is incorporated herein by reference.

FIELD OF THE INVENTION

The present invention generally relates to a fluid flow rate sensor and method for its operation.

BACKGROUND OF THE INVENTION

Fluid delivery systems have a wide variety of applications and are commonplace in many household appliances, such as metered water dispensers, icemakers, dishwashers, and clothes washers. In such systems, the volume of the fluid to be dispensed is typically controlled by a timing mechanism operable to open and then close a valve after predetermined period of time has elapsed.

These fluid delivery systems operate under the presumed condition that the fluid line pressure and, correspondingly, the fluid flow rate are known and static. All too often, however, the fluid delivery systems are susceptible to fluctuations in the fluid line pressure, and resultantly, the fluid flow rate varies. In such instances, when the fluid line pressure is lower than expected, an under-fill condition typically occurs. Conversely, when the fluid line pressure is greater than expected, an over-fill condition may result.

Consequently, it is desirable for fluid delivery systems to include an in-line sensor that monitors the fluid flow rate and enables the system to accordingly compensate the fluid delivery time.

Another desirable feature for a fluid flow sensor is the absence of any moving parts, such as a paddle-wheel or a turbine, for example. This is because there exists the probability that contaminants, debris or other small particle matter may be present in the fluid. Its function independent of moving parts, the fluid flow sensor is thereby more reliable under such operating conditions.

Thermo-anemometers are a type of flow rate sensor that does not require any moving parts to operate. Thermo-anemometers function based on the principles of heat transfer. Such flow rate sensors, though well-known, have traditionally lacked the necessary response times to make them suitable for many common applications, like water delivery systems for household appliances.

Traditional thermo-anemometers typically include two temperature sensors: one temperature sensor disposed at a downstream location in the fluid path for measuring the fluid temperature downstream; and another temperature sensor disposed at an upstream location in the fluid path for measuring the fluid temperature upstream. The sensor measuring the upstream temperature compensates for fluctuations in the water temperature that might bias the reading of the sensor measuring the downstream temperature. The thermo-anemometer subtracts the upstream temperature from the downstream temperature. By employing various known equations and thermal sensing principles, such as the Seebeck Effect, the temperature difference may be correlated to a fluid flow rate.

Other techniques for determining a fluid flow rate that are fundamentally based on thermodynamic principles are also known. For example, one method is to measure the heat loss, over time, of a known heat source that exposed in the flow of the fluid. The heat loss, expressed as a temperature drop, can be correlated to a fluid flow rate. This method, however, can take a relatively long time period to provide usable results. The reason is primarily because it can take several seconds for the temperature of the source to reach steady-state after being exposed to the fluid flow. In some applications, however, such as in an icemaker, for example, this response time is much too slow.

FIG. 1, illustrates an exemplary graph of a typical response curve (temperature (T) vs. time (t)) of one such known system. When temperature (T) is plotted versus time (t), it is seen that the steady state value for temperature is not reached for about 1.5 to 2.0 seconds after the fluid flow is initiated. In the example illustrated, temperature was measured under water flow rate conditions of both 0.15 gallons per minute (GPM) and 0.75 GPM.

The need remains, therefore, for a fluid flow sensor that does not involve any moving parts, has a faster response time, and is easily integrated into a variety of fluid delivery systems.

SUMMARY OF THE INVENTION

In accordance with the present invention, an improved fluid flow rate sensor and method of operation is provided. The invention comprises a thermo-anemometer-type fluid flow rate sensor design and a method for its operation that overcome the response time limitations of prior known fluid flow rate sensors.

In one aspect of the invention the fluid flow rate sensor comprises a probe having a detection module adapted to change condition in response to the presence of the flow of the fluid, a control module that is electrically connected to the probe that monitors the condition of the detection module over time (e.g., a temperature), determines a rate of change of that condition over time, and generates an output that is indicative of the rate of flow of the fluid, and a I/O module connected to the control module and communicating the output of the control module to another device or a user.

In another aspect of the invention, a method for operating the fluid flow rate sensor is provided.

As a thermo-anemometer-type sensor, the fluid flow rate sensor of the invention does not incorporate any moving parts. The design of the sensor of the invention and its method for operation results in the sensor having a faster response time than prior known fluid flow rate sensors making it suitable for many sensing applications not before available to thermo-anemometer-type fluid flow rate sensors. The fluid flow rate sensor of the invention may be easily integrated into a variety of fluid delivery systems.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 15 is an exemplary graph plotting the temperature response over time of the fluid flow rate sensor of the invention when operating in a mode to provide a sequentially updated output.

DETAILED DESCRIPTION OF THE PREFERRED EMBODIMENTS

The following description of the preferred embodiments is merely exemplary in nature and is in no way intended to limit the invention, its application, or uses.

The present invention provides an improved fluid flow rate sensor and associated method for operation improving the valid detection response time of the sensor and being capable of easy integration into a variety of fluid delivery or monitoring systems.

Figure 1:
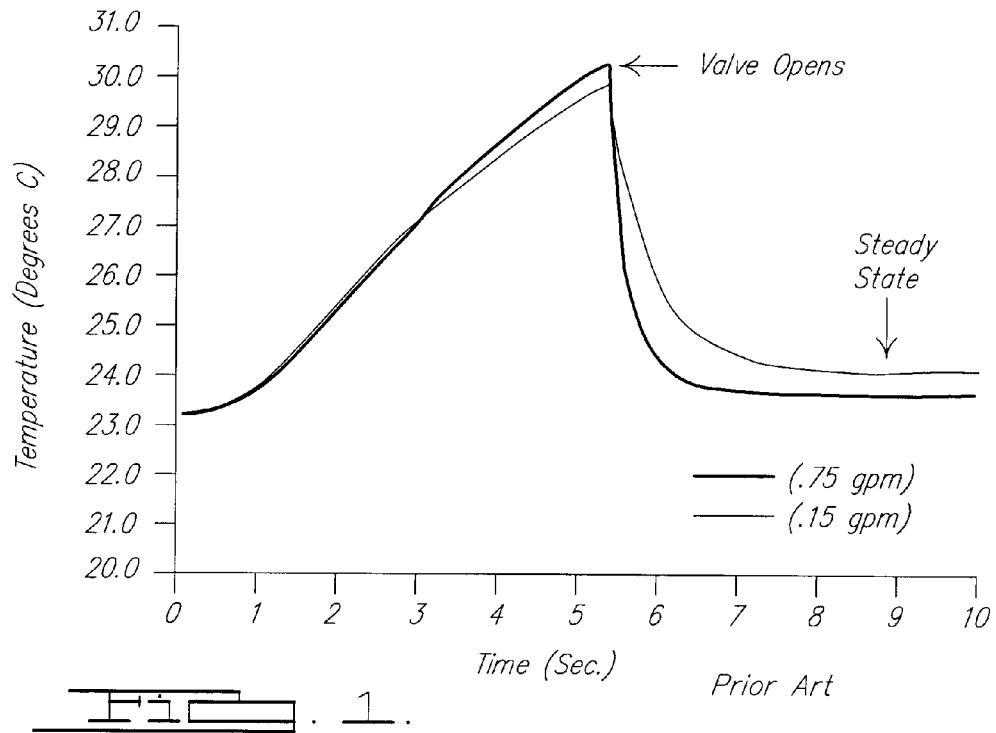
FIG. 1 is an exemplary graph plotting the temperature response over time for one prior art fluid flow rate sensor at two separate water flow rates.
Figure 2:
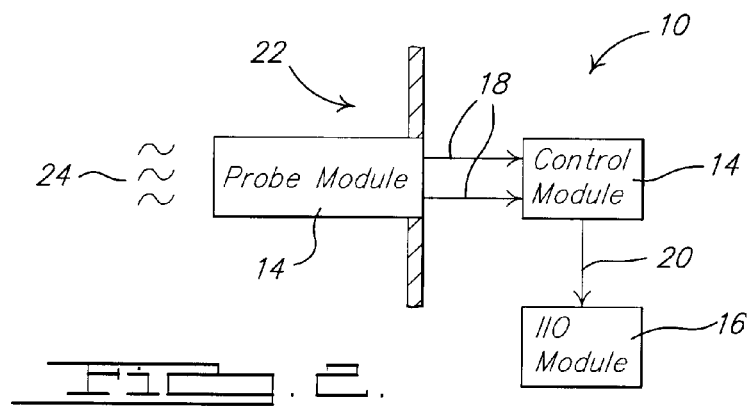
FIG. 2 is a schematic block diagram of a fluid flow rate sensor according to the invention.
Figure 3:
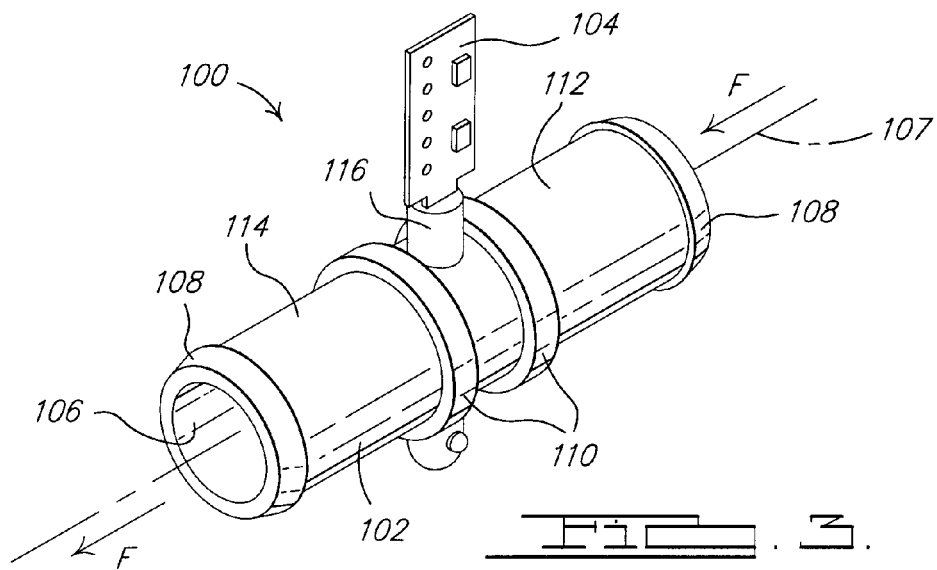
FIG. 3 is a perspective view of one embodiment of a probe for use with the fluid flow rate sensor of the invention.

FIG. 2 generally depicts the major components of the fluid flow rate sensor 10 of the invention. The sensor 10 generally includes a probe 12 coupled with a control module 14. An I/O module 16 may also be included in the sensor 10. As used in this description, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

The probe 12 is of the thermo-anemometer-type and has no moving parts. The probe 12 is typically disposed in a fluid environment 22 for detecting the flow rate of a fluid 24. When it is subjected to flow of the fluid 24, the probe 12 experiences changes in its condition represented by a signal 18 (e.g., a voltage).

The signal 18 from the probe 12 is continuously monitored by the control module 14. The control module 14 processes the signal 18 according to the method of the invention, and generates an output 20 that is indicative of a fluid flow rate. The I/O module 16 provides a means by which the sensor 10 can communicate its output 20 to other device(s) or a user.

It is presently contemplated that the fluid flow rate sensor 10 may be employed in a household appliance, such as a refrigerator, to monitor water flow in a water dispenser or automatic ice maker.

One embodiment of a probe 100 for use in the sensor 10 of the invention is shown in FIGS. 3-6. The probe 100 generally comprises a body 102 and a detection module 104.

The body 102, as shown, is a generally a cylindrically-shaped tubular member having a passageway 106 extending through its entire length along a longitudinal axis 107. Fluid 24 is able flow through the passageway 106 of the body 102 in a direction along the longitudinal axis 107. Annular flanges 108, 110 may be located at opposite ends 112, 114 of the body 102 to facilitate connection of the probe 100 to a fluid source, such as the flexible supply hose of a water dispenser, for example.

Located intermediate the ends 112, 114 of the body 102 is a housing 116. The housing 116 extends through the body 102 in a direction generally perpendicular to the longitudinal axis 107. The housing 116 is disposed within the passageway 106. The shape of the housing 116 is designed to promote laminar flow of the fluid flow moving through the passageway 106 and across the surface of the housing 116. The detection module 104 is received within the housing 116 such that the housing 116 encapsulates a portion of the detection module 104 to protect it from physical contact with the fluid environment. The housing 116, however, is capable of conducting thermal energy from the fluid environment to the detection module 104.

Both the body 102 and the housing 116 are preferably manufactured from thermally conductive polymers, such as, for example, polypropelene, polyvinylchloride, polyacetylene, polyparaphenylene, polypyrrole, and polyaniline. Ceramic and/or glass fillers mixed in with these base polymers have been shown to greatly enhance the material's thermal conductivity. One such material is known under the trade designation Konduit MT-210-14 and is available from GE/LNP.

Figure 6:
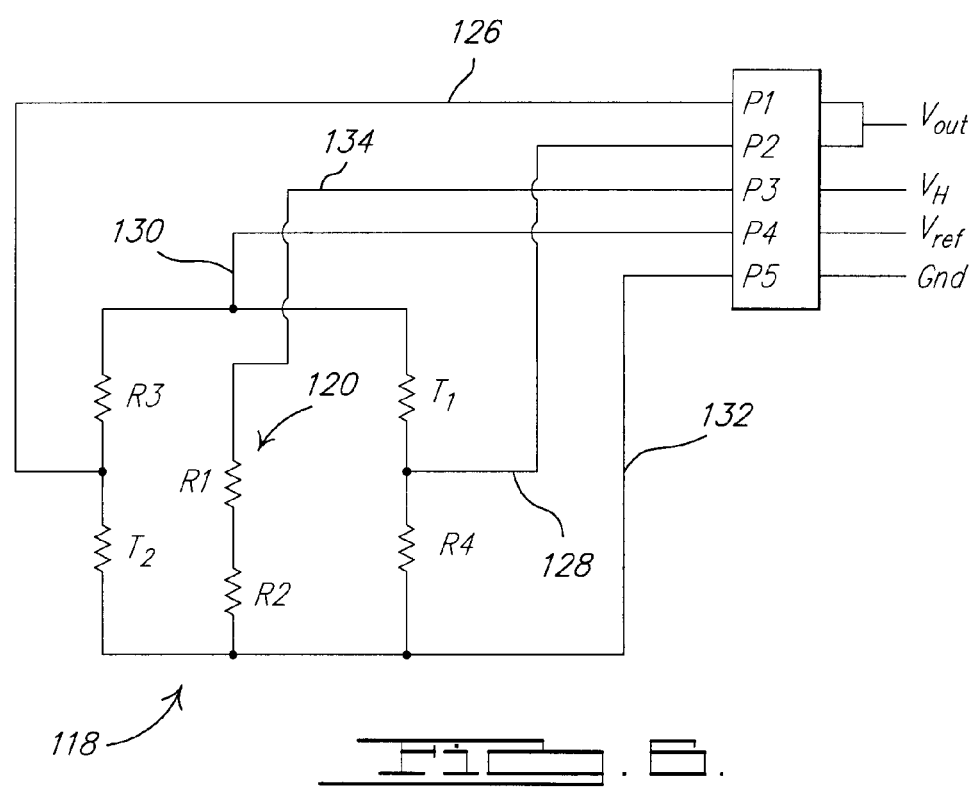
FIG. 6 is a schematic diagram of one embodiment of a detection circuit for use with the probe of FIG. 3.

The detection module 104 is shown in FIG. 6 as comprising a detection circuit 118 and a heating circuit 120. The detection module 104 is preferably highly thermally conductive and has a low thermal mass. The detection circuit 118 and a heating circuit 120 are deposited on a thermally conductive, glass-epoxy printed circuit board (PCB) substrate 124.

An exemplary detection circuit 118 comprises a pair of negative temperature coefficient (NTC) thermistors $T_1$, $T_2$ and a pair of resistors $R_3$, $R_4$ that together form a four-wire bridge circuit. Referring to FIG. 6, thermistor $T_1$ is coupled in series with resistor $R_4$ to form one leg of the bridge and thermistor $T_2$ is coupled in series with resistor $R_3$ to form the other leg of the bridge. Together, thermistor $T_1$ and resistor $R_4$ are coupled in parallel with thermistor $T_2$ and resistor $R_3$.

As shown, the detection circuit 118 includes traces 126, 128, 130, 132 that lead to a plurality of pin connectors $P_1$, $P_2$, $P_4$, $P_5$ located on the PCB substrate 124. Trace 130 terminates at pin $P_4$, where a reference voltage $V_{ref}$ is applied to the detection circuit 118. Traces 126, 128 are respectively coupled to opposite legs of the detection circuit 118 and terminate at pins $P_1$, $P_2$. An output voltage $V_{out}$, which can be calibrated to represent the temperature (T) of the thermistors $T_1$, $T_2$ as is well-known in the art, can be read at pins $P_1$, $P_2$. Trace 132 terminates at pin $P_5$ which is connected to ground.

It can be appreciated that having two thermistors in the detection circuit 118 of the invention accordingly increases the sensitivity of the circuit, thereby eliminating the need for additional signal conditioning to obtain the voltage output $V_{out}$.

The heating circuit 120 of the detection module 104 comprises a pair of heating resistors $R_1$, $R_2$. Trace 134 of the heating circuit 120 terminates at pin $P_3$. A voltage $V_H$ to power the heating circuit 120 is applied at pin $P_3$. The heating circuit 120 is electrically insulated from the detection circuit 118, but not thermally insulated. The heating resistors $R_1$, $R_2$ are located on the PCB substrate proximate to thermistors $T_1$, $T_2$, respectively, such that heat energy from the heating resistors $R_1$, $R_2$ is conducted to the thermistors $T_1$, $T_2$. The heating resistors are contemplated to provide as much as 4 to 6 watts.

It should be appreciated that the number of thermistors and heating resistors may vary depending on the application for the fluid flow rate sensor. For example, resistors $R_3$ and $R_4$ of the detection circuit 118 could be replaced with thermistors. Also, the heating resistors may be electrically in series or in parallel, or only a single heating resistor need be provided. Furthermore, heating resistor(s) and the(ir) corresponding voltage source may be omitted altogether in applications where the thermistor(s) can be internally self-heated.

Figure 4:
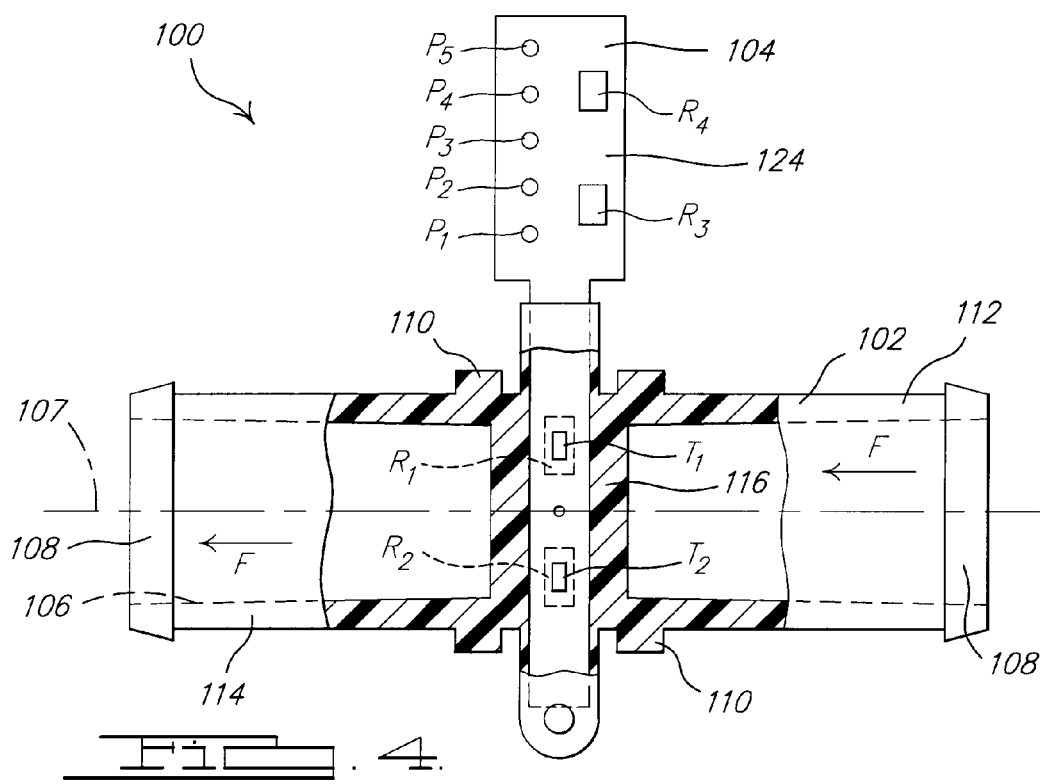
FIG. 4 is a front view of the probe of FIG. 3, shown in partial cross-section.

The detection module 104 is generally received within the housing 116 such that it is perpendicular to the direction of fluid flow F through the passageway 106. Referring to FIG. 4, one portion of the detection module's 104 PCB substrate 124 is located within the housing 116 such that it lies within the passageway 106 of the body 102. Another portion of the PCB substrate 124 extends beyond the housing 116 above the passageway 106 and still another portion of the PCB substrate 124 extends below the passageway 106.

Figure 5:
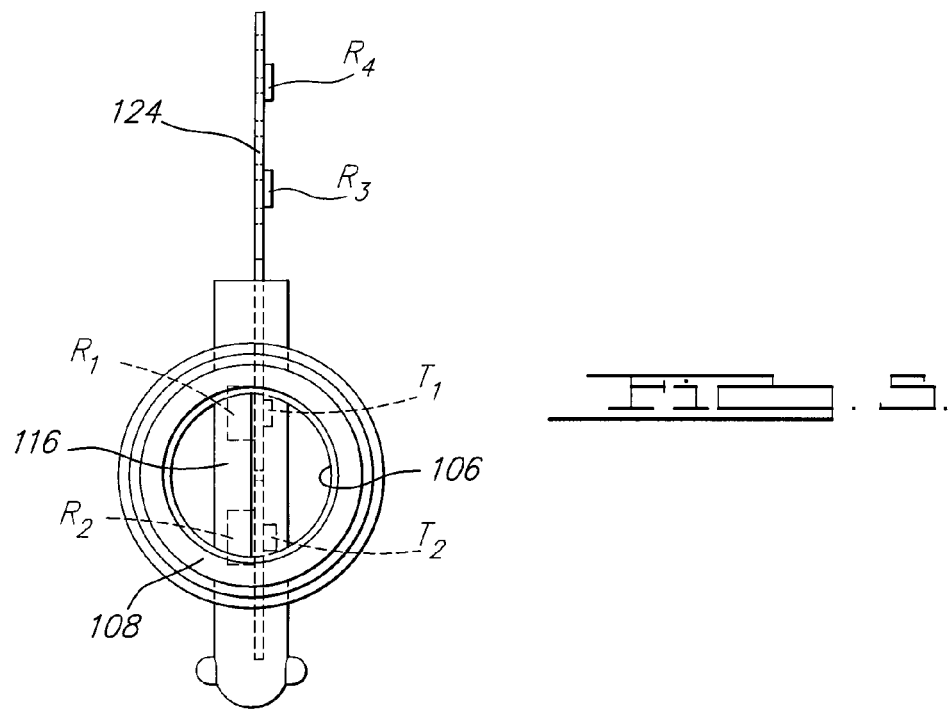
FIG. 5 is an end view of the probe of FIG. 3.

The detection circuit 118 and heating circuit 120 are arranged such that the thermistors $T_1$, $T_2$ and heating resistors $R_1$, $R_2$ lie on the portion of the PCB substrate 124 that is within the passageway 106 of the body 102. Resistors $R_3$, $R_4$ of the detection circuit 118 and all of the pin connectors $P_1$, $P_2$, $P_3$, $P_4$, $P_5$ lie on a portion of the PCB substrate 124 that extends outside of the housing 116, as best seen in FIGS. 4 and 5. Although all of the pin connectors $P_1$, $P_2$, $P_3$, $P_4$, $P_5$ are shown to be located on one side of the body 102, it is understood that the pin connector configuration could be modified, as desired, to relocate some or all of the pin connectors to the opposite side of the body 102.

Operation of the sensor 10 will now be described. The probe 100 for a fluid flow rate sensor 10 is coupled to the control module 14. Specifically, the control module 14 measures and analyzes $V_{out}$ from the probe 100 and correlates it to the flow rate of the fluid being measured by the sensor 10 to produce an output 20. An I/O module 16 may be coupled to the control module 14 to provide an interface for communicating the output 20 to other device(s) or a user.

Figure 7:
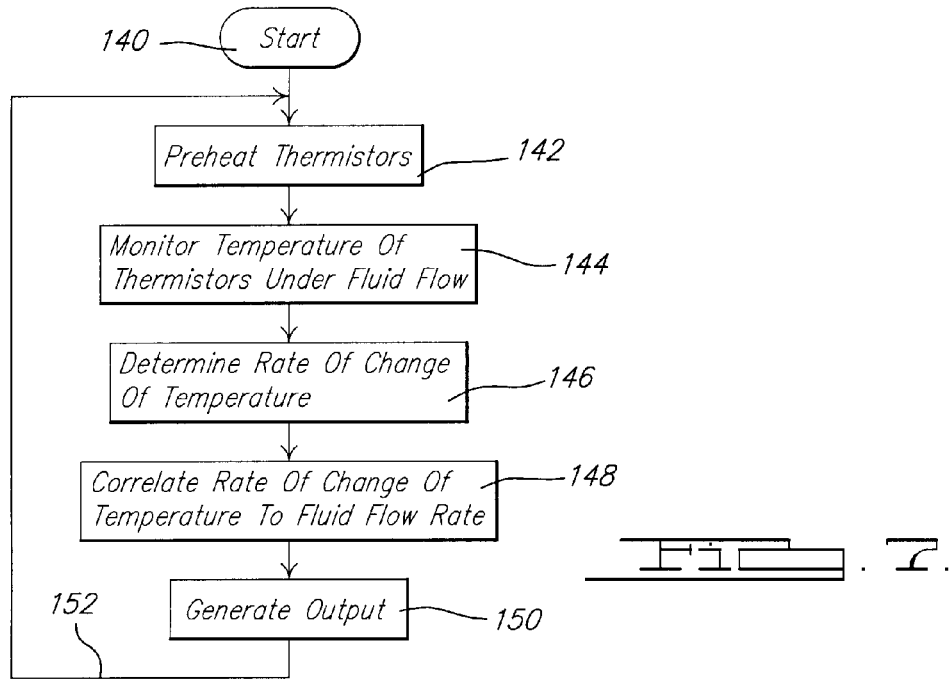
FIG. 7 is a flow chart describing the operation of the fluid flow rate sensor of the invention.

FIG. 7 shows a flowchart generally describing the operation of the fluid flow rate sensor 10 including a probe 100. The process starts at 140, with the fluid whose flow rate is to be measured being static, i.e., a fluid valve is closed and the fluid is not flowing through the passageway 106 of the probe 100.

Next, the thermistors $T_1$ and $T_2$ are preheated at 142. In this step, $V_H$ is applied to the heating circuit 120 by the control module 14, thereby energizing the heating resistors $R_{1a}$, $R_{2a}$ and causing the temperature of the thermistors $T_1$ and $T_2$ to increase from their initial starting temperature ($T_0$). The reference voltage $V_{ref}$ is applied to the detection circuit 118.

The output voltage $V_{out}$ of the detection circuit 118 is sampled at discrete time intervals (e.g., 25 msec). The temperature ($T_j$) of the thermistors $T_1$ and $T_2$ is determined from the output voltage $V_{out}$ in a well-known manner and as described below. This process is repeated until a predetermined temperature change threshold for the thermistors $T_1$ and $T_2$ has been reached (e.g., $T_j - T_0 > 25°$ C.). The value of $V_{out}$ is then stored and operation continues. $V_H$ may be held constant, reduced (as described further herein), or removed, depending on the sensor application.

Fluid flow is initiated, e.g., a fluid valve is opened and the fluid flows through the passageway 106 of the probe 100 and passes over and around the housing 116 and, consequently, the portion of the detection module 104 that is enclosed within the housing 116. As the fluid flows past the housing 116, heat is transferred from the thermistors $T_1$ and $T_2$ through the housing 116 and to the fluid. Correspondingly, both the temperature (T) of the thermistors $T_1$ and $T_2$ and the output voltage $V_{out}$ change over time (t).

At 144, the temperature (T) of the thermistors $T_1$ and $T_2$ is monitored. The output voltage $V_{out}$ from the detection circuit 118 is again sampled by the control module 14 at discrete time intervals (e.g., 100 msec). Again the temperature ($T_j$) of the thermistors $T_1$ and $T_2$ is determined from the output voltage $V_{out}$ in a well-known manner.

At 146, the control module 14 determines the rate of change of temperature ($T_j$) over time (i.e., it calculates $dT_j/dt$) as is well-known in the art. This process is repeated for a predetermined number of iterations (e.g., 10). At 148, the smallest value of $dT_j/dt$ is then correlated to a fluid flow rate. The control module 14 generates a corresponding output 20 at 150.

The I/O module 16 then is able to make the output 20 of the control module 14 available to, for example, a fluid flow controller (not shown) that determines how long a valve should be left open based upon the fluid flow rate that has been sensed by the sensor 10.

It should be understood that the sensor 10 can continue to operate even while fluid flow continues, to sequentially update the output 20. This is particularly useful in applications where the fluid flow rate does not remain constant. When operating in this manner, it is contemplated that power to the resistive heater(s) would be reduced after the initial pre-heat cycle 142. A power reduction of, for example, 50 percent is believed to be sufficient, though other power reductions may be satisfactory depending on the sensor's 10 application. The power reduction can be accomplished by modulating input to the heating resistor(s) in a well-known manner.

The sensor 10 would then continue to operate as previously described. After a first output 20 is generated at 150, the process is then repeated at 152. The heating resistor(s) are, therefore, again pre-heated at 142. The process continues and a second output 20 is generated at 150. Each successive loop of operation, therefore, provides a sequential output 20 that is indicative of the fluid flow rate, which may be changing over time. FIG. 15 is a graph illustrating the sequential pre-heating operation described above.

It is to be understood that the number and duration of the discrete time intervals referenced above may vary from the examples provided and may be dependent on the processing capabilities of the control module 14, including, for example, the control module's 14 processing speed and resolution.

As stated in the foregoing discussion, the manner in which the temperature of the thermistors' $T_{1a}$, $T_{2a}$ can be determined from the output voltage ($V_{out}$) of the detection circuit 118 is well-known.

First, the output voltage ($V_{out}$) can be correlated to the thermistors' $T_{1a}$, $T_{2a}$ resistance values ($R_{ntc}$) according to the following equation:

$$R_{ntc} = R_{fixed} * (V_{ref} - V_{out})/(V_{ref} + V_{out})$$

It is presumed for purposes of the invention that both thermistors $T_1$, $T_2$ are at the same temperature throughout the process, i.e., $T=T_1=T_2$, and that $R_3=R_4=R_{fixed}$. The temperature value (T) in degrees Kelvin is calculated, then, according to the following equation:

$$T=(1/T_o+\ln(R_{ntc}/R_o)/\beta)^{-1}$$

where temperature $T_o=298.15°$ K., $R_o$ is the thermistors' $T_{1a}$, $T_{2a}$ resistance at temperature $T_o$, and $\beta$ is an intrinsic parameter indicative of the temperature sensitivity of the thermistor.

The temperature measurements (T) are differentiated by the control module 14 to generate dT/dt, as is well-known. In the foregoing example, dT/dt is calculated as follows:

$$(T_j-T_{j-1})/(t_j-t_{j-1})$$

Although the differentiating operation has been discussed in the context of a first order derivative, it should further be understood that higher order derivatives of the temperature versus time curve may be utilized. It is believed that the use of higher order derivatives would further improve the response time of the sensor.

It should be understood that the validity of the operation of the detection circuit 118 can be evaluated theoretically using various equations and principles well known in the art. More specifically, heat transfer theory predicts that as soon as the fluid flow starts, the thermistor temperature (T) begins to drop rapidly. It can be shown that the temperature drop is exponential, namely it can be expressed as:

$$T-T_{final}=(T_{start}-T_{final})\exp(-Kt)$$

where $T_{start}$ is the temperature of the thermistor at the beginning of the fluid flow, $T_{final}$ is the steady state temperature of the thermistor when subject fluid flow, and t is the time after the flow starts. K, a constant, represents the cooling rate by the fluid and is considered to be a measure of the sensor's sensitivity. Since the sensor is cooled convectively by the fluid flow, K is proportional to the square-root of the flow rate.

In terms of the rate of temperature change over time (dT/dt), the minimum value of dT/dt occurs soon after the initiation of fluid flow. From the preceding equation, the maximum value is shown to be proportional to $K(T_{start}-T_{final})$. The temperature drop $(T_{start}-T_{final})$ slightly increases with the fluid flow rate. If the difference between $(T_{start}-T_{final})$ is neglected, the sensitivity of the sensor increases with K, which means that the sensitivity changes roughly as the square-root of the flow rate.

Figure 8:
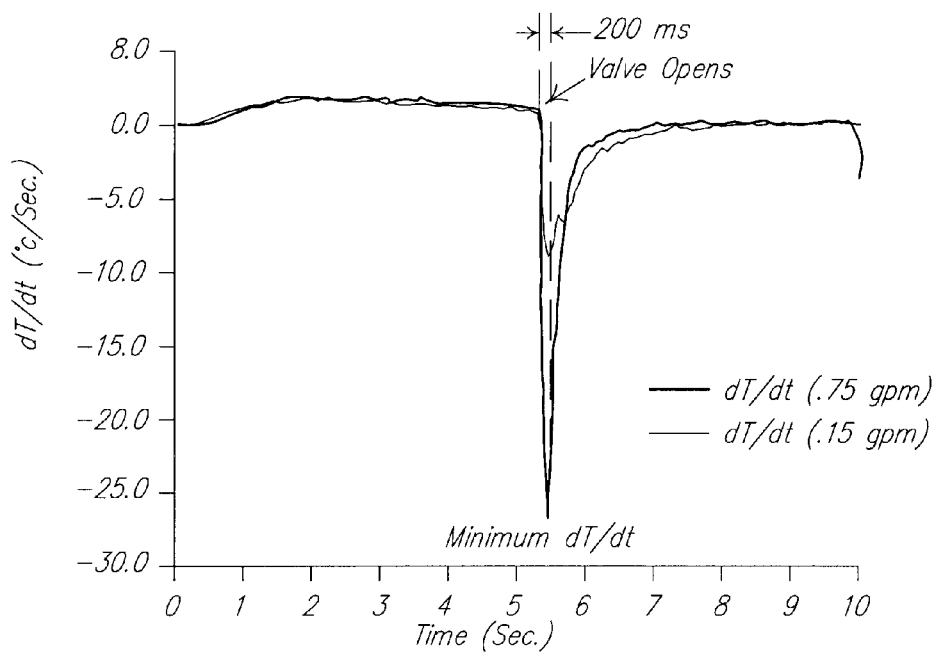
FIG. 8 is an exemplary graph plotting the rate of change of the temperature response over time for the fluid flow rate sensor of the invention.

Referring now to FIG. 8, an exemplary graph of the rate of temperature change over time of the thermistors in the detection circuit 118 of the fluid flow rate sensor 10 is shown. Calculating the numerical derivative of the temperature measurements taken by the control module 14 allows the fluid flow rate sensor 10 to reach a minimum dT/dt within a short amount of time (in this example, about 200 msec after the fluid flow begins). This time period is approximately one-tenth of the time period for the temperature (T) to reach a steady state value in a prior art device. As such, the method of operation of the invention has been shown to result in an order of magnitude improvement in the response time of fluid flow sensor 10 over the prior art. While a response time of about 200 msec is illustrated, it should be understood that the response time can vary with different types of sensors operating in different applications and under different operating conditions.

Figure 9:
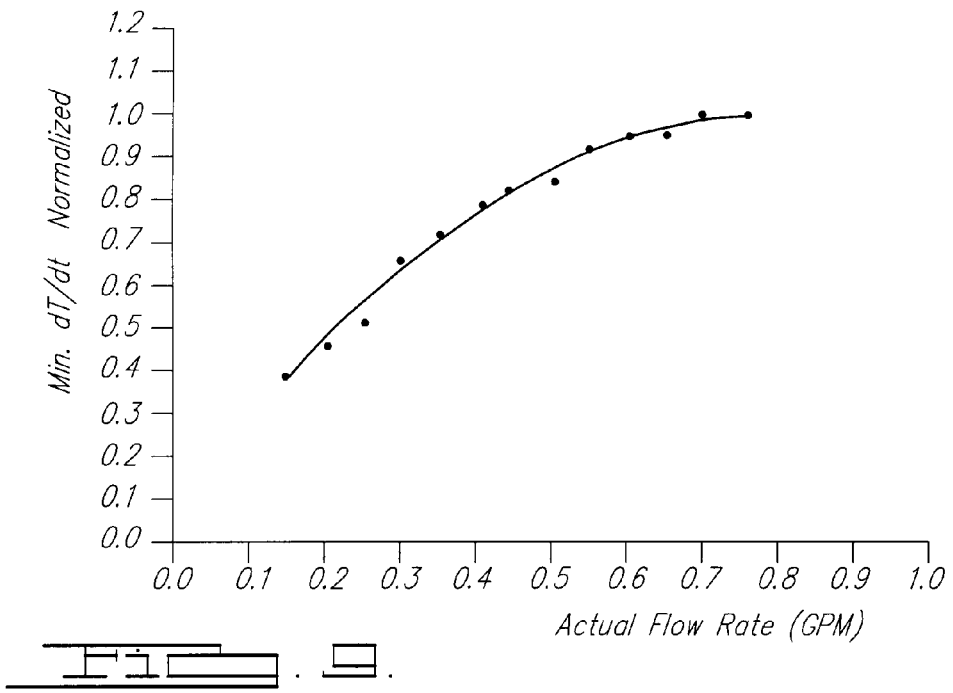
FIG. 9 is an exemplary graph correlating the normalized output of the fluid flow rate sensor of the invention with actual fluid flow rates.

The minimum dT/dt determined as part of the method of the invention can be normalized to calibrate the fluid flow rate sensor to an actual fluid flow rate in any particular sensor application. One example is shown in FIG. 9. This normalization process involves generating characteristic curves of dT/dt at various fluid flow rates. As shown in FIG. 9, the number of data points in this example is 13. Next the minimum dT/dt at each of the various flow rates is determined. The minimum dT/dt for each flow rate is then divided by the minimum dT/dt of the highest flow rate that is expected to occur in the device where the sensor 10 is to be employed. Consequently, the normalized flow rate values can be represented on a scale of 0 to 1, where 1 equals the highest anticipated flow rate.

Further improvements to optimize the thermal mass of the detection module 104 comprise utilizing a highly thermally conductive ceramic substrate upon which is screen printed a ceramic-filled paste material that forms the thermistors $T_1$ and $T_2$. Such material is available from Heraeus Incorporated, Circuit Materials Division under the R100 Series designation. Such a configuration completely eliminates the discrete thermistor components in the detection circuits 118 and helps to reduce the thermal mass of the detection module 104. A fluid flow rate sensor 10 of the invention constructed according to this configuration and operating as described above has demonstrated a response time in an icemaker application on the order of 0.5 to 1 second. This response time is on the order of a 50 percent or greater decrease in response time over the prior art.

Also, to improve the heat transfer characteristics and durability of the probe, it is contemplated that the housing 116 can be eliminated and a thin layer of a thermally conductive dielectric polymer or a glass material be applied directly to the detection module 104 as a glaze to encapsulate the detection module 104 and protect it from moisture and/or abrasion.

Figure 10:
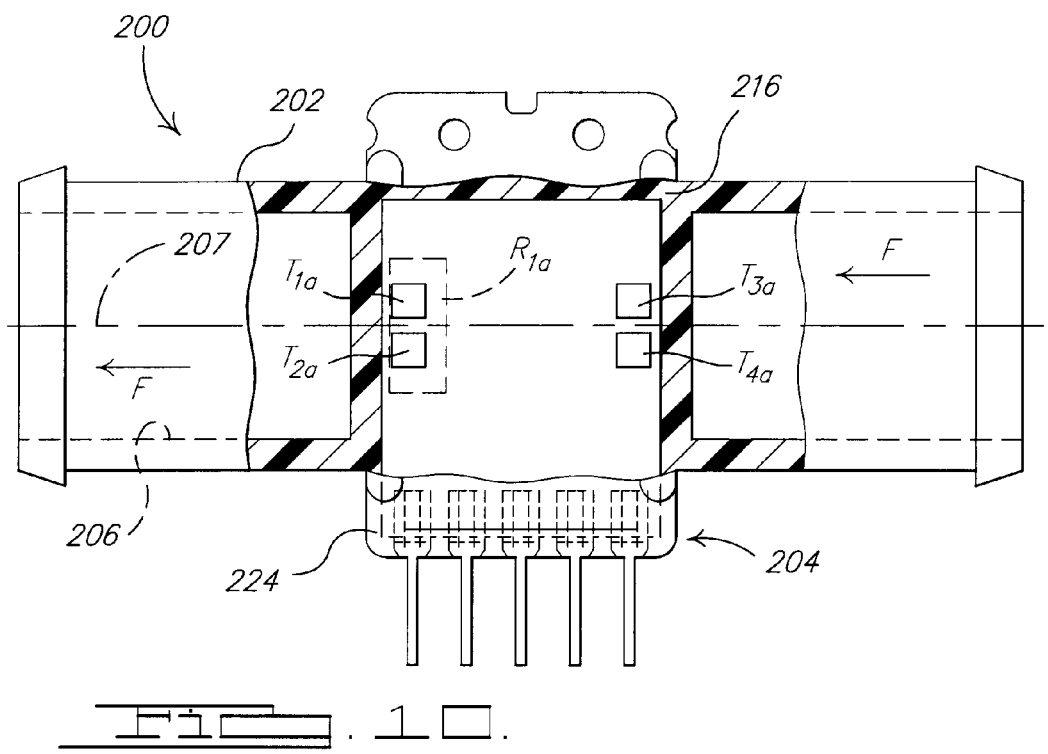
FIG. 10 is a front view of another embodiment of a probe for use with the fluid flow rate sensor of the invention, shown in partial cross-section.
Figure 11:
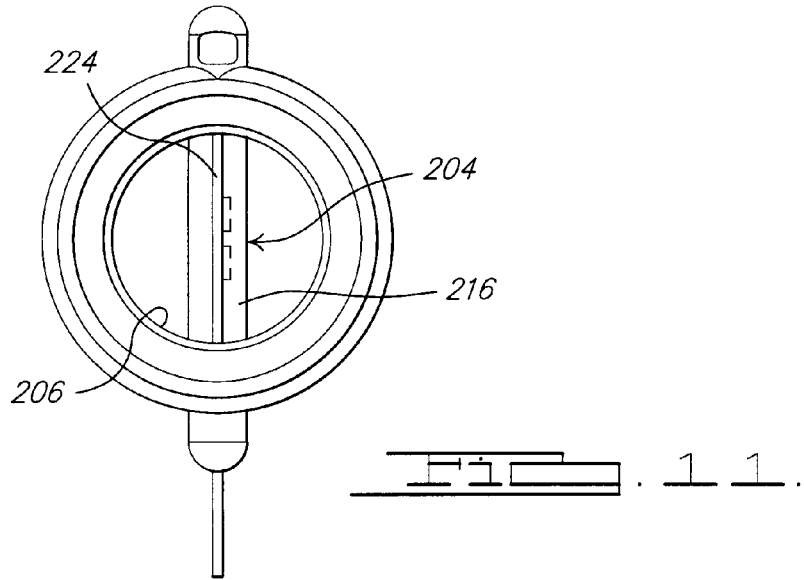
FIG. 11 is an end view of the probe of FIG. 10.
Figure 12:
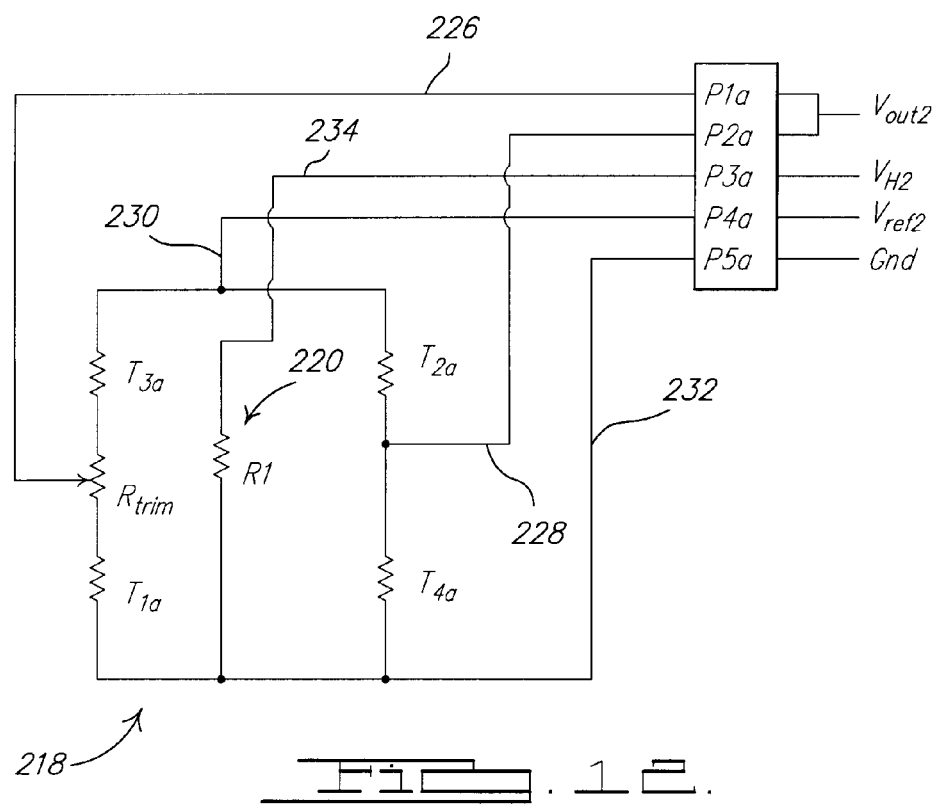
FIG. 12 is a schematic diagram of one embodiment of a detection circuit for use with the probe of FIG. 10.

Another embodiment of a probe 200 for use in the sensor 10 of the invention is shown in FIGS. 10-12. The probe 200, like the probe 100, also generally comprises a body 202 and a detection module 204. The body 202 is substantially similar to body 102, and like components are designated with like reference numerals.

Like the detection module 104 the detection module 204 comprises a detection circuit 218 and a heating circuit 220. The detection module 204, however, has a generally more rectangular configuration (as viewed in FIG. 10), with height to width ratio of about 3 to 2, where the width of the detection module 204 is measured along the longitudinal axis 208 of the probe body 202.

The detection circuit 218 comprises a plurality of NTC thermistors $T_{1a}$, $T_{2a}$, $T_{3a}$, $T_{4a}$ deposited on a ceramic substrate 224. The thermistors $T_{1a}$, $T_{2a}$, $T_{3a}$, $T_{4a}$ together form a 4-wire bridge circuit. Referring to FIG. 12, thermistor $T_{1a}$ is coupled in series with thermistor $T_{3a}$ to form one leg of the bridge and thermistor $T_{2a}$ is coupled in series with thermistor $T_{4a}$ to form the other leg of the bridge. Together, thermistor $T_{1a}$ and thermistor $T_{3a}$ are coupled in parallel with thermistor $T_{2a}$ and thermistor $T_{4a}$. An optional trim resistor $R_{trim}$ is included in series with thermistors $T_{1a}$ and $T_{3a}$ to enable the bridge circuit to be balanced, as is known in the art. The thermistors $T_{1a}$, $T_{2a}$, $T_{3a}$, $T_{4a}$ are preferably screen printed directly on a ceramic substrate 224.

Like the detection circuit 118, the detection circuit 218 includes traces 226, 228, 230, 232 that lead to a plurality of pin connectors $P_{1a}$, $P_{2a}$, $P_{4a}$, $P_{5a}$ located on the ceramic substrate 224. Trace 230 terminates at pin $P_{4a}$, where a reference voltage $V_{ref2}$ is applied to the detection circuit 218. Traces 226, 228 are respectively coupled to opposite legs of the detection circuit 218 and terminate at pins $P_{1a}$, $P_{2a}$. An output voltage $V_{out2}$, which can be calibrated to represent a temperature difference ($\Delta T$) across the bridge and between thermistors $T_{1a}$, $T_{3a}$ and thermistors $T_{2a}$, $T_{4a}$ as is well-known in the art, can be read at pins $P_{1a}$, $P_{2a}$. Trace 232 terminates at pin $P_{5a}$ which is connected to ground.

The heating circuit 220 of the detection module 204 comprises a heating resistor $R_{1a}$. Trace 234 of the heating circuit 220 terminates at pin $P_{3a}$. A voltage $V_{H2}$ to power the heating circuit 220 is applied at pin $P_{3a}$. The heating circuit 220 is electrically insulated from the detection circuit 218, but not thermally insulated. The heating resistor $R_{1a}$ is located on the ceramic substrate proximate to thermistors $T_{1a}$, $T_{2a}$ such that heat energy from the heating resistor $R_{1a}$ is conducted to the thermistors $T_{1a}$, $T_{2a}$. Heat energy from the heating resistor $R_{1a}$ is not, however, conducted to thermistors $T_{3a}$, $T_{4a}$. The heating resistor may have a rating of as much as 4 to 6 watts.

The detection module 204 is generally received within the housing 216 such that it is perpendicular to the direction of fluid flow F through the passageway 206. Referring to FIGS. 10 and 11, the detection module's 204 ceramic substrate 224 is located within the housing 216 such that it lies within the passageway 206 of the body 202. All of the pin connectors $P_{1a}$, $P_{2a}$, $P_{3a}$, $P_{4a}$, $P_{5a}$, however, extend outward from the housing 216. The detection circuit 218 and heating circuit 220 are arranged such that the thermistors $T_{1a}$, $T_{2a}$, $T_{3a}$, $T_{4a}$ and the heating resistor $R_{1a}$ all lie on the portion of the ceramic substrate 224 that is within the passageway 206 of the body 202. Further, the arrangement of thermistors $T_{1a}$, $T_{2a}$, $T_{3a}$, $T_{4a}$ is such that the unheated thermistors $T_{3a}$, $T_{4a}$ lie upstream in the fluid from the heated thermistors $T_{1a}$, $T_{2a}$.

The use of four thermistors $T_{1a}$, $T_{2a}$, $T_{3a}$, $T_{4a}$ in the detection circuit 218 and the thermistors' $T_{1a}$, $T_{2a}$, $T_{3a}$, $T_{4a}$ physical arrangement in the passageway 206 of the body 202 provide further advantages. One significant advantage is that the output voltage $V_{out2}$ is automatically compensated for ambient temperature changes, i.e., changes in the temperature of the fluid. This is important because if significant and/or rapid changes in the fluid temperature occur, they could distort the output of the sensor 10 causing the sensor 10 to give inaccurate results.

For example, first assume that the temperature of the static fluid (i.e., before flow is initiated) is at 25° C. In this environment then, the sensor 10 begins its operation as described above with reference to FIG. 7. Then assume that the temperature of the fluid drops to 10° C. upon initiation of fluid flow. It is readily understood by those of ordinary skill that the 10° C. fluid flowing at a given rate will have a greater capacity to remove heat from the thermistors than the 25° C. fluid flowing at the same rate. In such a case, then, the uncompensated sensor would be unable to discern that the change in temperature that it measures, and the rate of change in the temperature that it determines, has resulted, at least in part, due to the reduction in the temperature of the fluid.

The output voltage $V_{out2}$ of the detection circuit 208, however, represents a temperature difference ($\Delta T$) across the bridge and not an absolute temperature (T). This is because the unheated thermistors $T_{3a}$, $T_{4a}$ on opposite sides of the bridge of the detection circuit 208 counter-act the impact on the output voltage $V_{out2}$ caused by temperature changes in the fluid. Consequently, the compensated sensor measures the change in relative temperature and calculates the rate of change of the relative temperature.

Figure 13:
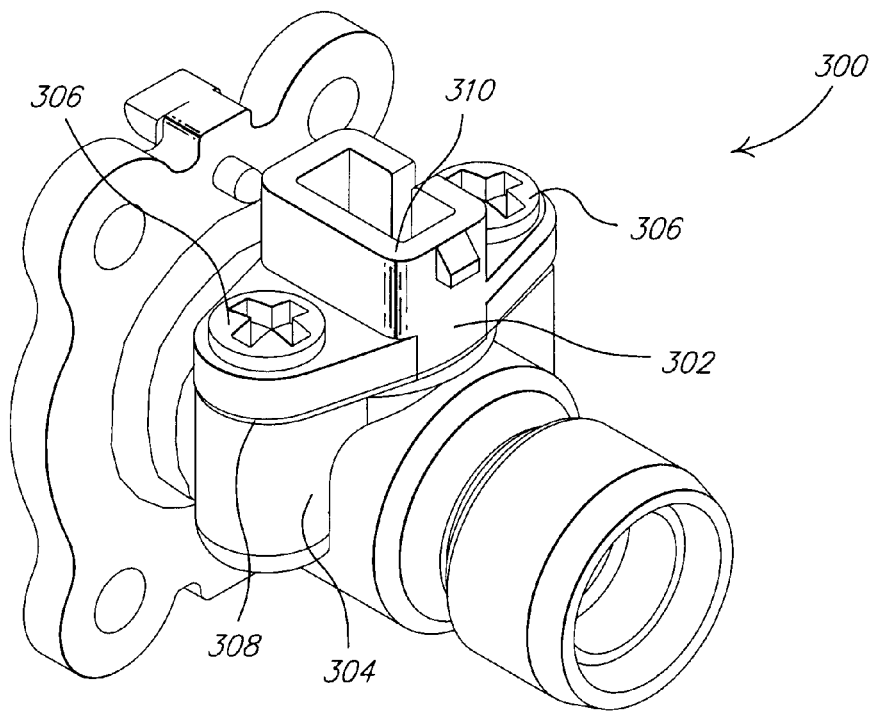
FIG. 13 is a perspective view of a valve assembly including a fluid flow rate sensor in accordance with the invention.
Figure 14:
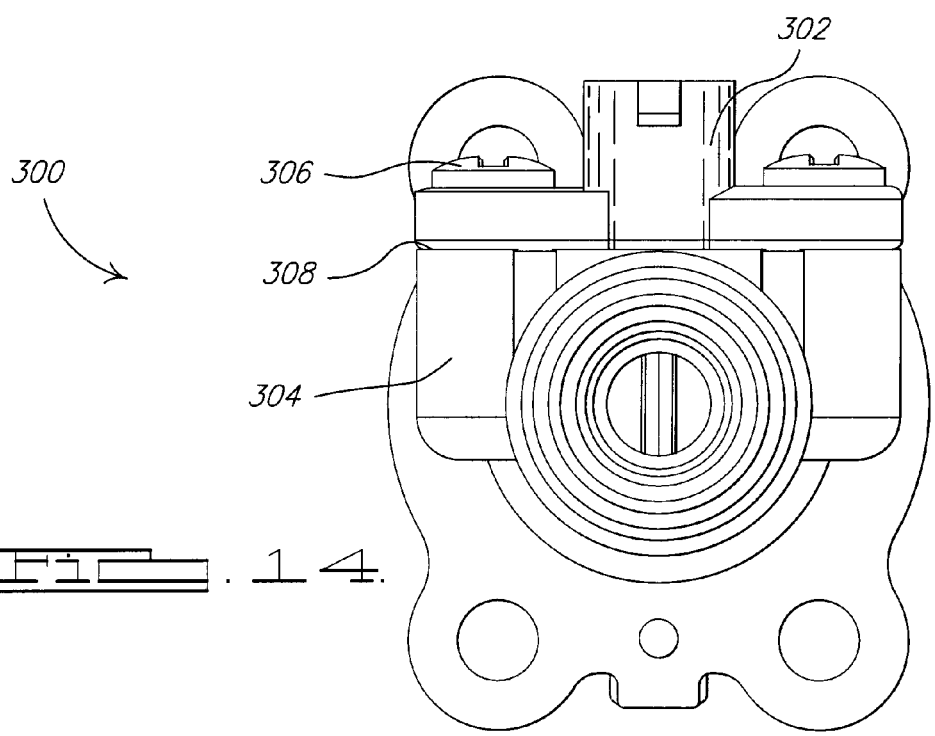
FIG. 14 is an end view of the valve assembly of FIG. 13.
Figure 13:
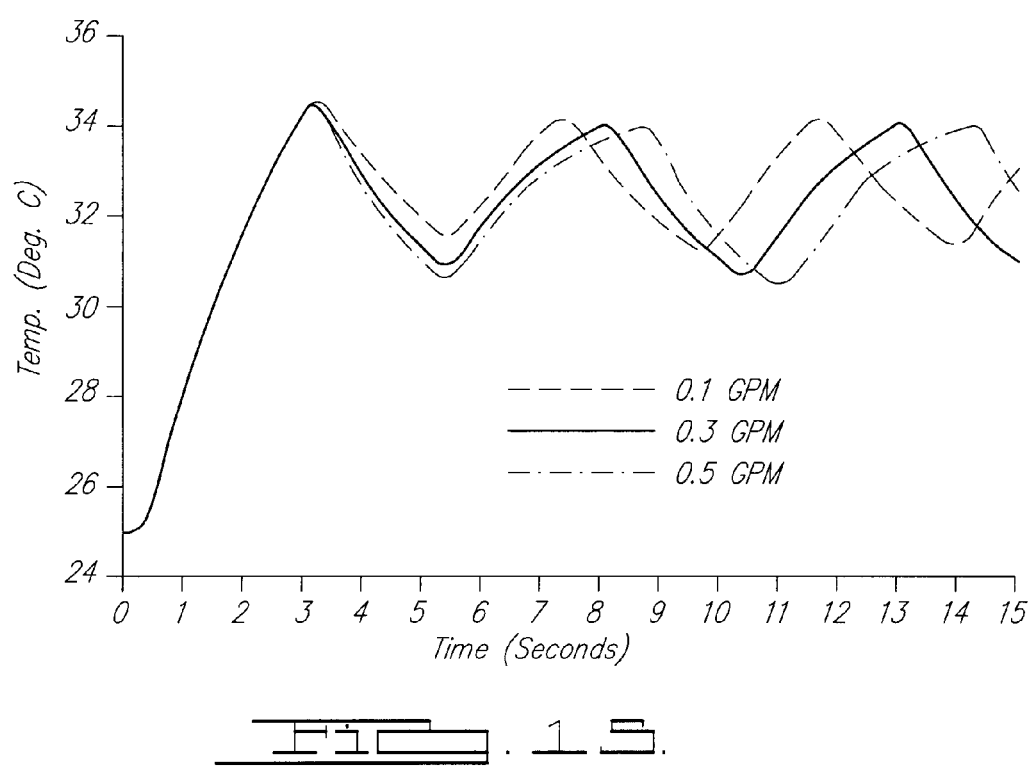

FIGS. 13 and 14 show an exemplary valve assembly 300 integrating a probe 302 four use with the sensor of the invention. The probe 302 is mounted to the body 304 of the valve assembly 300 with fasteners 306 and a sealing means 308. Depending on the application, the probe 302 may be mounted at the inlet or outlet side of the valve assembly 300. Pin connectors 310 can connect the probe 302 with a control module.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A probe for a fluid flow rate sensor comprising:
   a body having an upstream end and a downstream end, the body defines
   a passageway extending between the upstream end and the downstream end;
   a substrate in the passageway that has a first side and a second side that is opposite to the first side;
   a detection circuit disposed on the first side that includes a first thermistor and a second thermistor that are both within the passageway, the first thermistor is proximate to the upstream end and the second thermistor is proximate to the downstream end, the detection circuit is adapted to provide a voltage that varies in response to a change in temperature of the first thermistor and the second thermistor; and
   a heating circuit disposed on the second side that is electrically insulated from the detection circuit and includes a resistor proximate to the second thermistor such that the resistor is in thermal communication with the second thermistor and not the first thermistor; and
   a housing comprising a thermally conductive polymeric material and encapsulating a first portion of the substrate to protect the substrate from moisture and abrasion.

2. The probe of claim 1, wherein the substrate is a ceramic substrate, the detection circuit and the heating circuit are on the ceramic substrate;
   wherein the first portion is within the passageway and a second portion of the substrate is outside the passageway; and
   wherein the detection circuit and the heating circuit are disposed within the passageway on the first portion.

3. The probe of claim 1, wherein the first thermistor and the second thermistor comprise a ceramic-filled paste.

4. The probe of claim 1, wherein the first side and the second side define a length of the substrate; and
   wherein the first side is spaced apart from the second side at a distance equal to a width of the substrate.

5. The probe of claim 4, wherein the length is greater than the width.

6. The probe of claim 1, wherein the first side and the second side each extend in a direction parallel to a longitudinal axis at an axial center of the passageway.

7. The probe of claim 1, wherein the detection circuit further comprises a third thermistor proximate to both the first thermistor and the upstream end;
   wherein the detection circuit further comprises a fourth thermistor proximate to both the second thermistor and the downstream end; and
   wherein each of the first thermistor, the second thermistor, the third thermistor, and the fourth thermistor are discrete thermistors.

8. The probe of claim 1, wherein the detection circuit further comprises a trim resistor.

9. A probe for a fluid flow rate sensor comprising:
   a body including an upstream end and a downstream end, the body defines a passageway extending between the upstream end and the downstream end, a longitudinal axis extends from the upstream end to the downstream end through an axial center of the body;

a rectangular detection module mounted in the passageway, the detection module includes a width that extends parallel to the longitudinal axis and a height that extends perpendicular to the longitudinal axis;

a first surface of the detection module;

a second surface of the detection module that is opposite to the first surface, the longitudinal axis is between the first surface and the second surface;

a detection circuit on the first surface, the detection circuit includes a first thermistor proximate to the upstream end and a second thermistor proximate to the downstream end, the detection circuit is adapted to provide a voltage that varies in response to a change in temperature of the first thermistor and the second thermistor;

a heating circuit on the second surface, the heating circuit is electrically insulated from the detection circuit and includes a resistor proximate to the second thermistor such that the resistor is in thermal communication with the second thermistor and not the first thermistor; and a housing comprising a thermally conductive polymeric material;

wherein at least a portion of the rectangular detection module is encapsulated by the housing to protect the detection module from moisture and abrasion.

10. The probe of claim 9, wherein the detection circuit and the heating circuit are on a ceramic substrate.

11. The probe of claim 9, wherein the first thermistor and the second thermistor comprise a ceramic-filled paste.

12. The probe of claim 9, wherein the detection circuit further comprises a third thermistor proximate to both the first thermistor and the upstream end;

wherein the detection circuit further comprises a fourth thermistor proximate to both the second thermistor and the downstream end; and wherein each of the first thermistor, the second thermistor, the third thermistor, and the fourth thermistor are discrete thermistors.

13. A probe for a fluid flow rate sensor comprising:

a body having an upstream end and a downstream end, the body defines a passageway extending between the upstream end and the downstream end, a longitudinal axis extends through an axial center of the passageway;

a substrate within the passageway, the substrate includes a first side and a second side that is opposite to the first side, the first side and the second side each extend parallel to the longitudinal axis, the first side is spaced apart from the second side at a distance equal to a width of the substrate;

a detection circuit disposed on the first side that includes:
 a first thermistor proximate to the upstream end;
 a second thermistor proximate to the downstream end;
 a third thermistor proximate to the first thermistor and the upstream end;
 a fourth thermistor proximate to the second thermistor and the downstream end;
 each of the first thermistor, the second thermistor, the third thermistor, and the fourth thermistor are discrete thermistors;
 the detection circuit is configured to provide a voltage that varies in response to a change in temperature of at least one of the first thermistor, the second thermistor, the third thermistor, and the fourth thermistor;

a heating circuit disposed on the second side that is electrically insulated from the detection circuit and includes a resistor proximate to the second thermistor and the fourth thermistor such that the resistor is in thermal communication with the second thermistor and the fourth thermistor, and not in thermal communication with the first thermistor and the third thermistor; and a housing comprising a thermally conductive polymeric material and encapsulating a first portion of the substrate to protect the substrate from moisture and abrasion.

14. The probe of claim 13, wherein the first thermistor, the second thermistor, the third thermistor, and the fourth thermistor each comprise a ceramic-filled paste.

* * * * *